United States Patent [19]

Sazegar

[11] 4,278,192
[45] Jul. 14, 1981

[54] SKI AND POLE CARRYING BRACKET

[76] Inventor: Frank Sazegar, 1978 Gladwick St., Compton, Calif. 90220

[21] Appl. No.: 109,142

[22] Filed: Jan. 2, 1980

[51] Int. Cl.³ .............................................. B60R 9/12
[52] U.S. Cl. .................................. 224/315; 224/319; 224/324; 224/325; 224/917
[58] Field of Search ............... 224/455, 315, 317, 319, 224/324, 325, 917; 211/60 SK; 248/214, 223.4

[56] References Cited

U.S. PATENT DOCUMENTS

| | | | |
|---|---|---|---|
| 2,133,883 | 10/1938 | Aubert | 211/60 SK |
| 3,348,747 | 10/1967 | Vuarchex | 224/315 |
| 3,425,567 | 2/1969 | Murray | 211/60 SK |
| 3,626,553 | 12/1971 | Darney et al. | 224/45 S |
| 3,756,420 | 9/1973 | Brown | 224/324 X |
| 3,776,437 | 12/1973 | Carney | 224/324 X |
| 3,836,058 | 9/1974 | Penniman et al. | 224/917 X |
| 3,893,606 | 7/1975 | Hofmann | 229/917 X |
| 3,897,895 | 8/1975 | Read | 229/917 X |

FOREIGN PATENT DOCUMENTS 197807  7/1978  U.S.S.R. ............................. 211/60 SK

Primary Examiner—Stephen Marcus
Attorney, Agent, or Firm—William C. Babcock

[57] ABSTRACT

Set out herein are two bracket structures attachable to the roof rack of an automobile, where the bracket structures each include forked brackets conformed to receive both the skiis and the poles between the tines thereof. The brackets are adapted for sliding engagement into slotted clamps which are mounted on the roof rack. When engaged in the clamps, each of the brackets may be secured by a lock for secure transport. When removed from the clamps, each of the brackets forms an integral carrying assembly rendering the manipulation of the skiis and the poles convenient. Each of the brackets, furthermore, is conformed as a fork pivoted by one exterior tine and engaging by the other exterior tine to a base plate. This alignment of the forks can only be made upon the removal of the bracket assembly from the clamps, thus assuring a secure attachment which can only be released upon the release of a lock.

6 Claims, 5 Drawing Figures

SKI AND POLE CARRYING BRACKET

BACKGROUND OF THE INVENTION

1. Field of the Invention

The present invention relates to carrying structures, and more particularly to carrying structures adapted for use with ski equipment.

2. Description of the Prior Art

In the engagement of skiing endeavors, the participant is often encumbered with the task of transporting skiis from a remote parking area to the ski slope. To render this transportation task convenient, various clamping devices have been devised in the past which in one way or another connect the skiis and the poles into one integral structure. These clamping devices in their prior form were often of such configuration that they could also be used in the course of mounting the skiis on the roof or the other exposed areas of an automobile. It is the rendition of these aspects into a more convenient form that is entailed herein. More specifically, most of the prior art devices accommodating both automotive transport and manual carrying of the skiis to the slope did so with elaborate complexity and therefore entailed substantial costs to the user. Furthermore, the same complexity entailed also rendered the attachment thereof relatively easily broken and the pilferage of skiis as they were being transported in automobiles was therefore a common incident.

SUMMARY OF THE INVENTION

Accordingly, it is the general purpose and object of the present invention to provide a bracket assembly useful in securing skiis and poles which by virtue of its structure may also be engaged to the roof rack of an automobile.

Other objects of the invention are to provide a bracket assembly which in multiple form may be used to secure skiis together for the manual transport to the ski slope.

Yet additional objects of the invention are to provide a ski carrying bracket assembly which is easy to produce, convenient in use and requires few parts.

Briefly these and other objects are accomplished within the present invention by providing two clamps which are respectively attachable to the opposed end of a roof rack, each clamp including a transverse slot conformed to receive a rectangular bracket carrying base plate.

More specifically, the transverse slots include longitudinally opposed recesses which are sized for the receipt of the foregoing base plate. Attached to the base plate and extending orthogonally therefrom is a ski carrying bracket conformed as a forked structure having three tines, one exterior tine being pivotally attached to the base plate with the other two tines being moveable by flexure relative thereto. To render the relative flexure of the tines more convenient, the common juncture thereof may include stress relieving bores, some of the bores being sized to receive the ski poles on the interior thereof.

In this form the flat surfaces of the skiis may be inserted between the tines, the poles being similarly inserted into the stress relieving bores, and the tines of the bracket may then be translated into the slot by way of the translation of the base plate through the opposed recesses. When in position, the tines may be locked to the clamping structure on the roof rack to facilitate transport. To accommodate skiis of various dimensions the tines may be clamped at more than one degree of separation with the result that thinner or thicker skiis may be thus carried. Upon the release of the base plate out of the clamp the skiis, together with the poles, may be transported by the engaged alignment of the tines which may then be released when the skiis are to be put to use.

DESCRIPTION OF THE SPECIFIC EMBODIMENT

Figure 1:
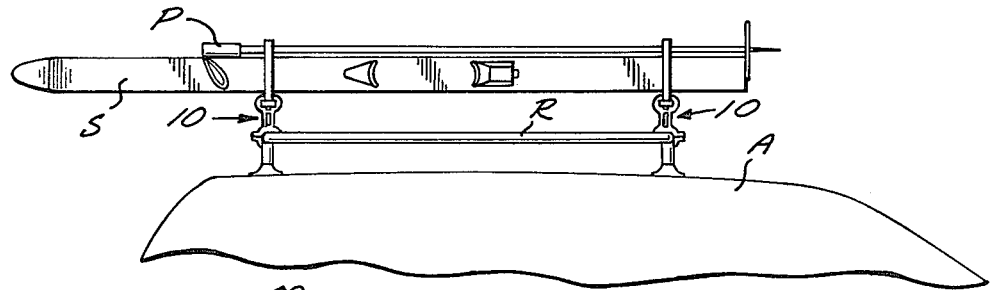
FIG. 1 is perspective illustration of an automobile roof rack provided with the carrying assembly constructed according to the invention herein.
Figure 2:
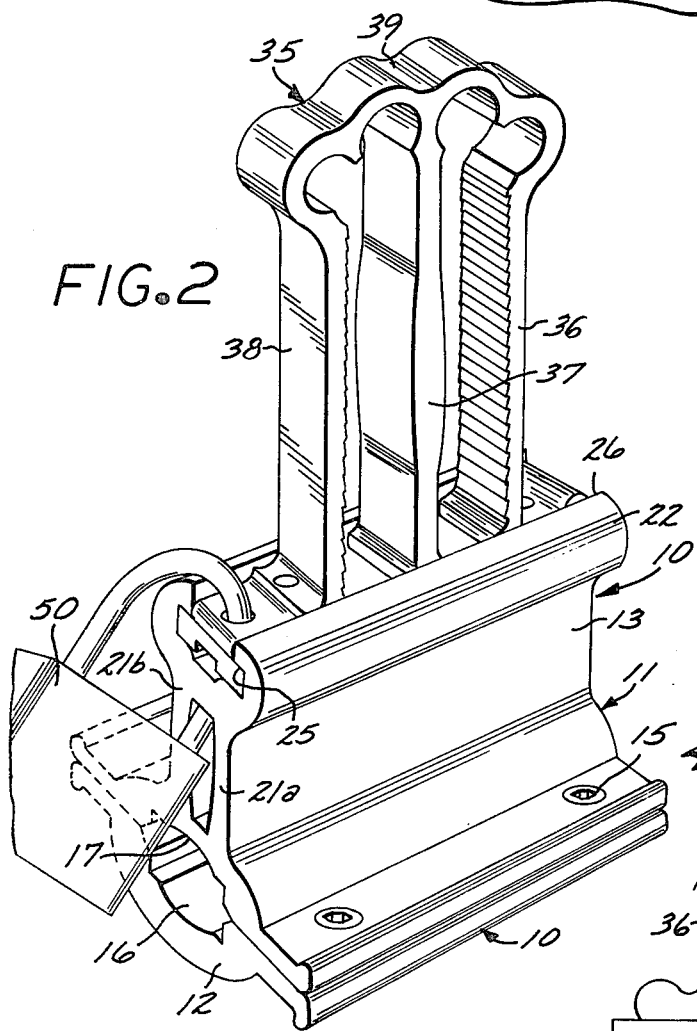
FIG. 2 is a perspective illustration of one carrying assembly useful with the invention herein.
Figure 3:
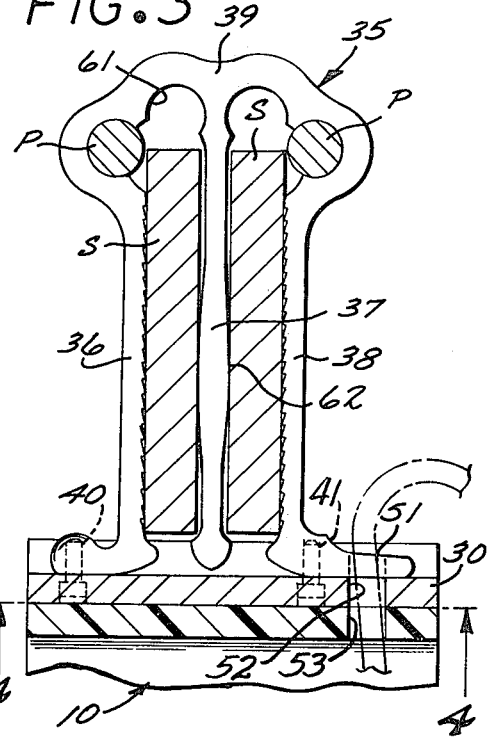
FIG. 3 is a front view of a bracket assembly useful with the invention herein.

As shown in FIGS. 1-3, an automobile A is normally provided with a roof rack R either of the permanent type or of the type removably installed, roof rack R having members which extend both longitudinally and transversely relative the automobile. Mouned on the roof rack R, and particularly in a fore and aft alignment thereon, are two inventive ski carrying bracket assemblies, each one thereof being generally designated by the numeral 10. It is to be understood that the foregoing bracket assembly 10, whether used fore or aft on the roof rack R, is similarly constructed and the detailed description of one therefore refers to the details of the other. Each of the bracket assemblies 10 includes a clamping structure 11 comprising a lower clamping shell 12 and an upper clamping shell 13, joined across a mating plane by way of two sets of fasteners 15. To accommodate the engagement of the fore and aft elements of the roof rack R both the lower and the upper clamping shells includes rack receiving recesses 16 and 17 respectively, which upon the connection of the shells relative each other form an elongate opening in which a roof rack element is clamped. In this form the clamping structure is permanently affixed to the rack R, the fasteners joining the shells together being provided with specially keyed apertures to render the removal thereof difficult. The upper clamping shell 13 may include a vertically extending support structure shown by way of two parallel ribs 21a and 21b which at their other edges are attached to a slide assembly 22. Slide assembly 22 may be provided with a longitudinal opening of rectangular section shown as opening 25 communicating to the exterior of the assembly by way of a longitudinal slot 26. Opening 25 may be conformed to receive in telescoping engagement a rectangular base plate 30 to which a bracket assembly 35 is attached.

Figure 4:
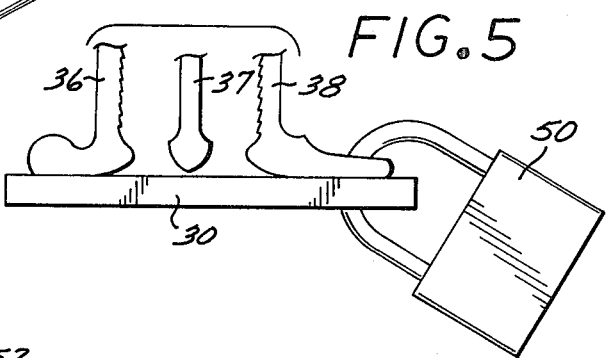
FIG. 4 is a sectional view taken along line 4—4 of FIG. 3.

More specifically, bracket assembly 35 comprises a forked structure having three tines 36, 37 and 38 extending substantially parallel relative each other from a common cap segment 39. Tine 36, being one of the exterior tines, is pivotally secured proximate the bottom end thereof to the rectangular base plate 30 by way of an Allen screw 40. The other exterior tine 38 is similarly attached to an Allen screw 41 which extends, according to the illustration in FIG. 4, into either one of two transverse slots 42 or 43 in the base plate 30. The middle tine 37 is somewhat shorter than the two exterior tines and is thus free to flex therebetween. It is contemplated that the spacing between tines 36, 37 and 38 be such as to accommodate skiis in their normal configuration. Thus the variations that often occur between the variously manufactured skiis may be accommodated by the selective engagement of the Allen screw 41 in either one of the lateral slots 42 or 43. For these reasons, slot 42, for example, may provide a larger spacing between the tines while slot 43, as shown in the illustration in FIG. 4, may be the more restrictive slot.

The lateral dimensions of the bracket assembly 35 are conformed to fit on the interior of the slots 26. Thus when inserted either in the lateral slot 42 or the slot 43 the translation of the base plate 30 into the interior of the recess 25 immediately fixes the relative spacing of the tines. This spaced arrangement may then be secured by way of a padlock 50 which extends through a common opening formed in an end projection 51 on the end of tine 38 which aligns in common with an elongate opening 52 formed in base plate 30 and a corresponding opening 53 in the clamping assembly 11.

Figure 5:
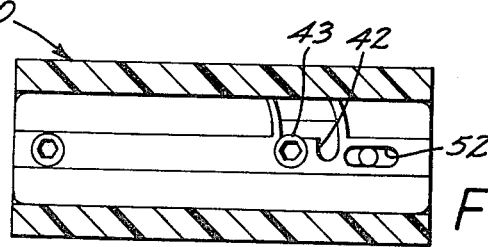
FIG. 5 is yet another detail view illustrating the alignment of the bracket's tines for transport.

As illustrated in FIG. 5 this same lock 50 may be moved upon the withdrawal of the bracket assembly from the clamping structure to engage just the base plate 30 to the end projection 51. Once more an integral configuration is formed outside of the clamping structure which renders the transport of the skiis and poles convenient for the user.

To accommodate clamping of skiis of various dimensions and to render the flexure of tines 36, 37 and 38 relative each other more convenient, the joining segment 39 includes a plurality of release bores 61 at the juncture of the tines thereto. These bores 61 may also be conformed to receive the ski poles P on the interior thereof, the same structure which is utilized to relieve bending stresses being also useful for this purpose. In addition, the center tine 37 may include an enlarged central portion or gulley 62 to provide a point contact against the skis S secured therebetween. Thus in the event tight clamping is desired, the exterior tine 38 may be manipulated to advance the Allen screw 41 on the end thereof into the lateral slots 43. In this event, substantial forces are generated at the point contact with the belley 62 securing the skiis in place. Once this contact is established, the opposing surfaces of tines 36 and 38 may be provided with transverse serrations 63 which grip the skiis during transport. Accordingly, whether carried away from the rack or when in place on the roof rack R a very tight engagement between the bracket assembly and the skiis is achieved. This tight arrangement is, furthermore, achieved across release openings 61 which, upon inward flexure of the tines, also grasp the poles P therein.

Some of the many advantages of the present invention should now be readily apparent. In the form provided, the invention allows for the carrying of skiis both on the rack of an automobile and independent thereof. In each instance plastic extrusions may be used for the basic structure, allowing both for the manufacturing convenience, and for a simple and reliable configuration.

Obviously many modifications and changes can be made to the foregoing description without departing from the spirit of the invention. It is therefore intended that the scope of the invention be determined solely on the claims appended hereto.

What is claimed is:

1. Apparatus for securing various skiing articles to each other and for releasably attaching the collected skiing articles to an automobile, comprising:
   a support assembly conformed for attachment to said automobile including a transverse opening of substantially rectangular section communicating through an elongate slot to the exterior thereof;
   a base plate of substantially rectangular plan form adapted for insertion on the interior of said transverse opening;
   a fork-like bracket assembly having a first and second exterior leg on the distal sides thereof and an interior leg disposed therebetween, said interior leg being shorter than said first and second exterior legs, said first and second exterior legs and said interior leg being dimensioned for receipt in said slot;
   pivoting means connected to the free end of said first exterior leg and engaged to said base plate for pivotal engagement of said bracket assembly to said base plate; and
   latch means connected to the free end of said second exterior leg for engaging said base plate in a first or second spaced alignment relative said pivoting means.

2. Apparatus according to claim 1 wherein:
   said bracket assembly is formed of a flexible material structure.

3. Apparatus according to claim 2 wherein:
   said bracket assembly includes stress relieving circular bores at the juncture of said first and second exterior leg, said stress relieving bores being conformed to receive ski poles.

4. Apparatus according to claim 3 wherein:
   said first and second exterior legs are each separated from said interior leg by a separating gap conformed to receive a ski.

5. Apparatus according to claim 4 wherein:
   said interior leg includes an enlarged section for pressing said skiis against said first and second exterior legs.

6. Apparatus according to claim 5 further including:
   lock means formed in said base plate and said support assembly for releasably securing said base plate to said support assembly.

* * * * *